US006339990B1

(12) United States Patent
Strietzel et al.

(10) Patent No.: US 6,339,990 B1
(45) Date of Patent: Jan. 22, 2002

(54) GRIPPING DEVICE, PARTICULARLY FOR AUTOMATIC PRINTING AND/OR INSERTING MACHINES

(75) Inventors: Rainer Strietzel, Heidelberg; Kurt Wittig, Weinheim, both of (DE)

(73) Assignee: ASG Luftfahrttechnik und Sensorik GmbH, Weinheim (DE)

( * ) Notice: Subject to any disclaimer, the term of this patent is extended or adjusted under 35 U.S.C. 154(b) by 0 days.

(21) Appl. No.: 09/559,057

(22) Filed: Apr. 28, 2000

(51) Int. Cl.[7] .............................. B41F 1/30; B23B 31/02

(52) U.S. Cl. .................. 101/408; 101/483; 324/207.24; 279/126

(58) Field of Search ................................ 101/408, 483; 358/1.18; 324/207, 207.24; 340/825, 320; 279/126; 276/56; 271/263

(56) References Cited

U.S. PATENT DOCUMENTS

| | | | | | |
|---|---|---|---|---|---|
| 3,955,073 | A | * | 5/1976 | Carew et al. | 101/483 |
| 4,078,784 | A | * | 3/1978 | Miaskoff et al. | 270/56 |
| 4,536,000 | A | * | 8/1985 | Röhm | 279/126 |
| 4,973,957 | A | * | 11/1990 | Sitimizu et al. | 340/825.52 |
| 5,079,502 | A | * | 1/1992 | Rogackl et al. | 324/267.19 |
| 5,973,494 | A | * | 10/1999 | Masreliez et al. | 324/207.24 |
| 6,115,136 | A | * | 9/2000 | Tsukamoto et al. | 358/1.18 |

* cited by examiner

*Primary Examiner*—Eugene Eickholt
(74) *Attorney, Agent, or Firm*—Dennison, Scheiner & Schultz

(57) ABSTRACT

The invention concerns on the one hand a gripping device (10), particularly for automatic printing and/or inserting machines, with a first and second gripping element (22, 24) of which at least one gripping element (22) can be moved relative to the other gripping element (24) to grab sheet-like materials such as printed pages as well as with a measuring device (42) for the recording of at least one position of the gripping elements (22, 24) towards each other, and on the other hand a method for recording a relative position of gripping elements within a gripping device. In order to be able to adjust the gripping device to different sheet thicknesses as well as to improve proneness to malfunctions, the system provides for the measuring device (42) to have a transmitter (52) and a sensor (54) that is allocated to it for the continuous recording of the relative position of the gripping elements (22, 24) towards each other, with the transmitter (52) being arranged in a moveable gripping element (22) and the sensor (54) in the fixed gripping element (24), or vice versa. The invention provides for the position of the gripping elements towards each other to be continuously recorded, for a signal with different signal values to be generated in accordance with a number of sheet-like materials grabbed between the gripping elements and/or for the signal values to be compared to target values and for an error message to be generated in the case of a deviation.

19 Claims, 3 Drawing Sheets

Figure 1:
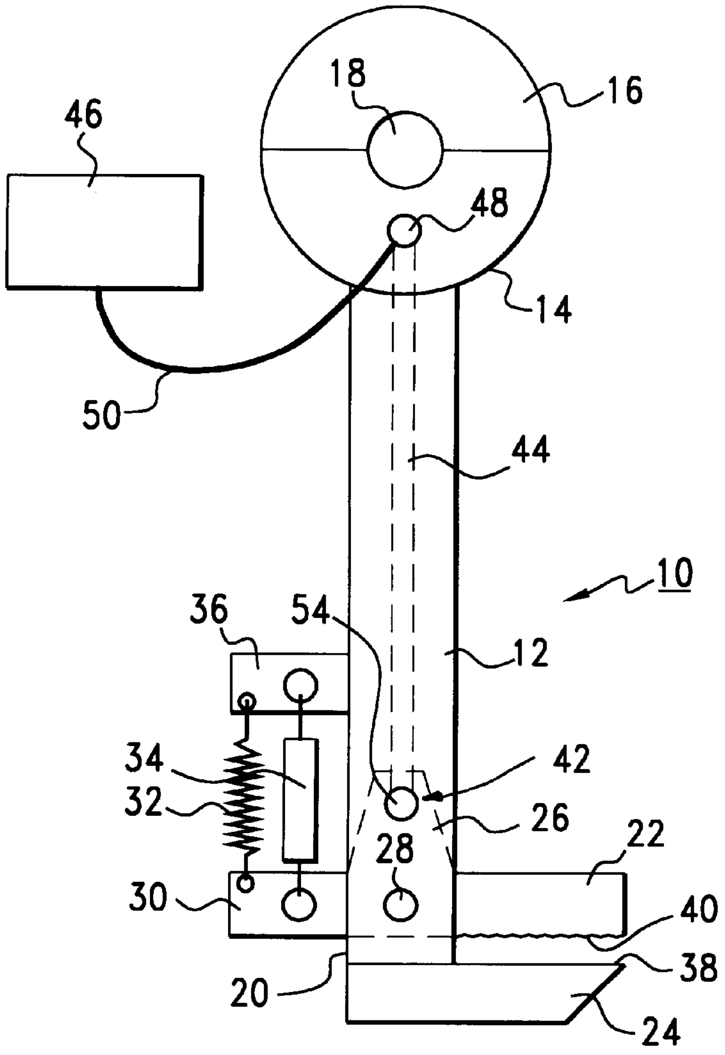

FIG.3
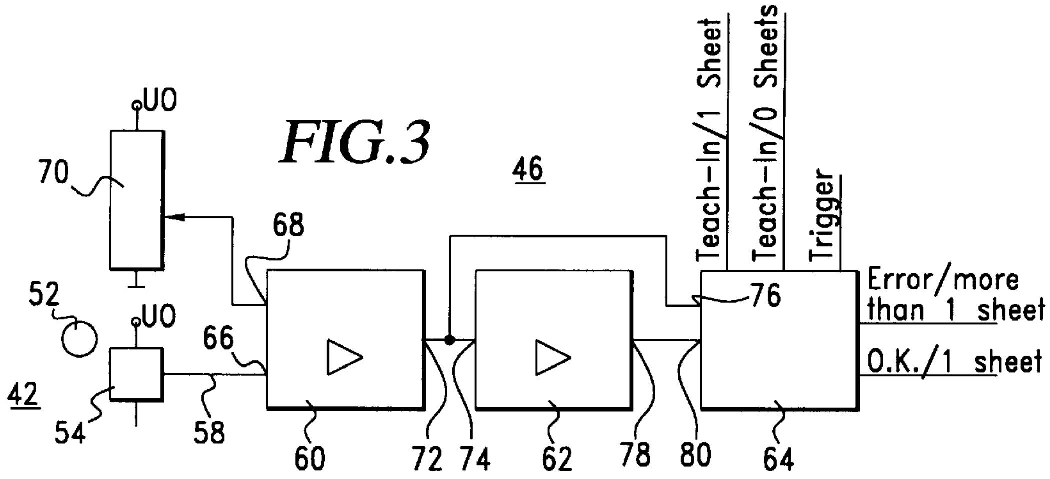
FIG.4
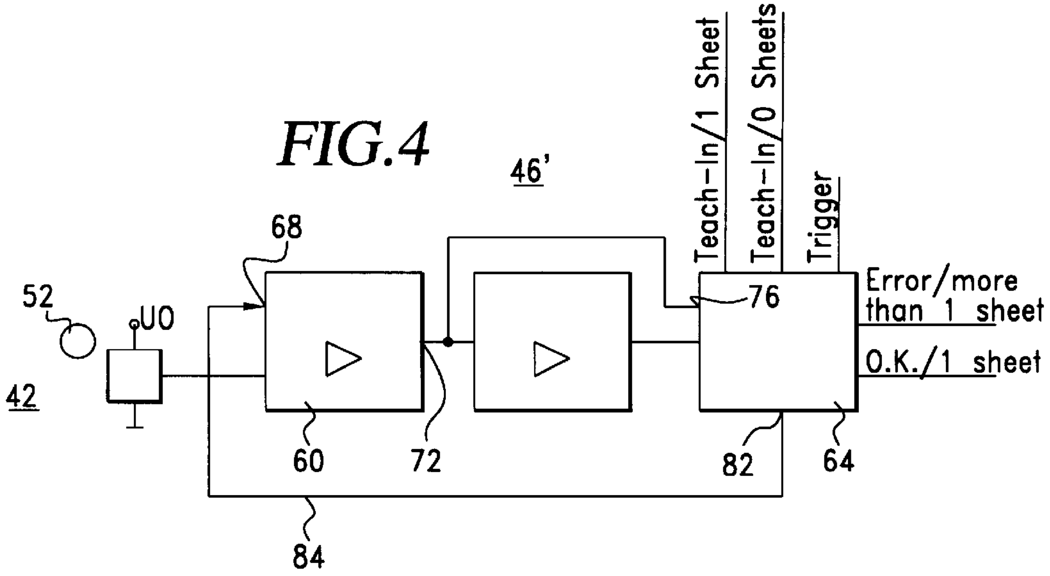
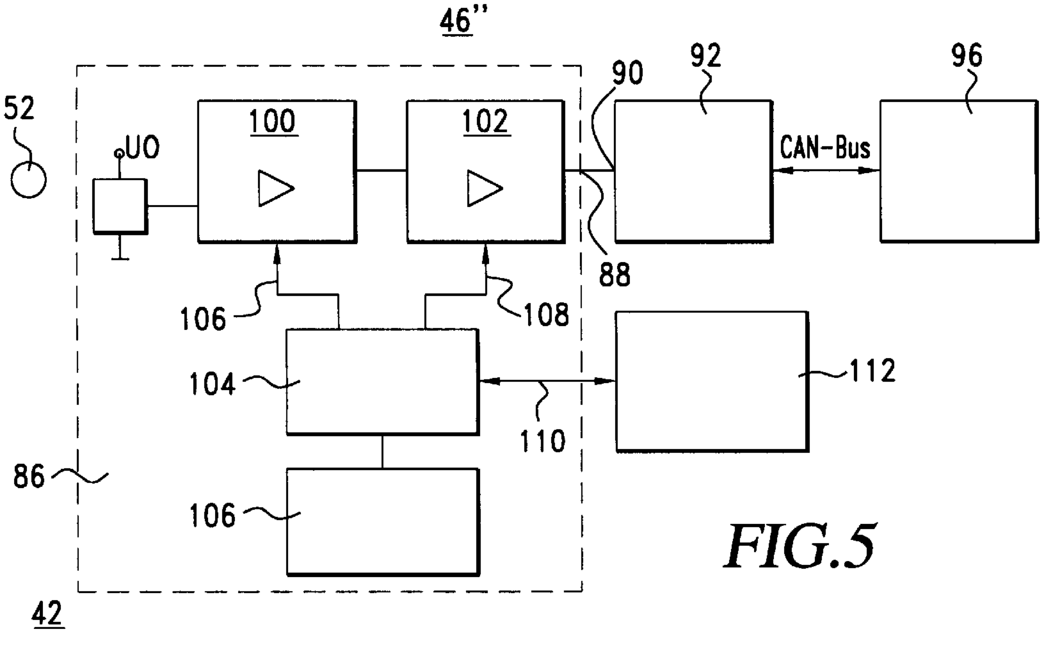
FIG.5

GRIPPING DEVICE, PARTICULARLY FOR AUTOMATIC PRINTING AND/OR INSERTING MACHINES

The invention concerns on the one hand a gripping device, particularly for automatic printing and/or inserting machines, with a first and second gripping element of which at least one gripping element can be moved relative to the other gripping element to grab sheet-like materials such as printed pages as well as with a measuring device for the recording of at least one position of the gripping elements towards each other, and on the other hand a method for recording a relative position of gripping elements within a gripping device.

Gripping devices of the kind described above are used, for example, by banks or insurance companies on machines for the automatic insertion of bank statements or invoices. Such machines take printed pages such as bank statements or invoices individually off a stack, fold them and slide them into an envelope, which is then sealed.

In familiar gripping devices at least one gripping element, for example, is opened with a cam controller or a compressed air cylinder and then closed again with spring elasticity. It could happen that due to a malfunction in the paper feed two or more sheets are grabbed by the gripping device and forwarded for further processing. It could therefore happen that, for example, two bank statements or two invoices that were meant for different customers are wrongly placed in one envelope. Such an error must be absolutely avoided, also in light of data protection issues.

In order to be able to avoid this error, the suggestion was made to attach an additional lever arm on at least one gripping element, which operates one or two limit switches, depending on the opening of the gripping device. The switch positions are evaluated in order to determine whether the gripping device grabbed no sheet, one sheet or more than one sheet.

However, this familiar solution has the disadvantage that the limit switches have complex mechanic adjustment features and have to be readjusted with every order due to changes in paper thickness. Also, the stability of the mechanical system is not sufficient so that the system is unsafe and prone to malfunctions despite complex adjustment procedures.

The invention is based on the task of further developing a gripping device of the kind described above in such a way that it is not prone to malfunctions and that adjustments to different paper thicknesses can be done in a simple maimer.

The problem is resolved with the device by equipping the measuring device with a transmitter and a sensor that is allocated to it for the continuous recording of the relative position between the first and the second gripping element, with the transmitter being arranged in a moveable gripping element and the sensor in a fixed gripping element, or vice versa. The signal emitted by the sensor can then be evaluated in a subsequent evaluating circuit. Due to the continuous recording process of the position between the two gripping elements, the evaluation of the signal can show whether—as desired—one sheet or—wrongly—more than one sheet is located between the gripping elements. Mechanical adjustments to changes in paper quality or paper thickness are no longer required.

The measuring device preferably releases an analog signal, the height of which is proportional to a distance formed between the gripping elements.

In a particularly preferred version, the transmitter has the design of a magnet and the sensor that of a Hall effect sensor.

Here, the sensor can be arranged in the fixed gripping element and the magnet in or on the moveable gripping element. It is ensured that the magnet exercises an immediate effect on the sensor, i.e. moves closely in front of the sensor so that the position of the moveable gripping element can be recorded continuously.

Depending on whether the gripping device is empty, has grabbed one sheet or several sheets, the magnet reaches a different position with regard to the Hall effect sensor. The Hail effect sensor releases a slightly modified analog electric potential, which is evaluated. Apart from the number of sheets that were grabbed, this analog electric potential is also dependent on the thickness of one sheet.

The sensor is connected to a signal processing device for the purpose of evaluating the signals; the device consists of a compensating circuit, an amplifying circuit and an evaluating circuit. The sensor is connected to a first inlet of the compensating circuit, whose outlet on the one hand is connected to an inlet of the amplifying circuit and on the other hand to a first inlet of the evaluating circuit. The outlet of the amplifying circuit is connected to a second inlet of the evaluating circuit.

In order to compensate for the no-voltage of the sensor, a second inlet of the compensating circuit can be connected to a potentiometer. In this case, adjustment of no-voltage is done manually. In a preferred version, the second inlet of the compensating circuit is connected to a second outlet of the evaluating circuit in order to feed supply voltage from auxiliary circuits. The evaluating circuit releases analog supply voltage from circuits to the compensating circuit. In order to adjust the amount of supply voltage from auxiliary circuits, it is useful to feed the evaluating circuit also the non-amplified differential potential.

It has proven particularly beneficial to use an intelligent sensor with integrated compensating and amplifying circuits. In this sensor, the compensating and amplifying circuits are connected to a logic circuit such as a microprocessor, which in turn is connected to data storage such as EEPROM. The intelligent sensor has the particular advantage that no-voltage is compensated for internally and that amplification can be adjusted internally.

The components are selected by the implemented logic device (CPU), which during calibration of the sensor mounted on the gripping device obtains matching data from an external computer system via a communication line and stores it in a storage medium such as EEPROM. It has also proven beneficial to connect the sensor with a higher machine control system via an evaluating circuit and via a bus such as a CAN bus.

Furthermore, the invention refers to a method for recording a relative position of the gripping elements of a gripping device, which is characterized by the fact that the position of the gripping elements towards each other is continuously recorded, that in accordance with the number of sheet-like materials grabbed between the gripping elements a signal is generated with different signal values, that the signal values are compared to target values and that in the case of a deviation an error message is created. The signal released by the sensor is compensated, amplified and evaluated. During the evaluation process of the signal, the evaluating circuit can be fed auxiliary signals in order to be able to provide the time of the measurement (for example, gripping element closed).

For the adjustment of the evaluating circuit (Teach-In), a zero value $U_{CLOSED}$ is determined in the case of closed gripping elements without sheet-like material and a target value $U_{TARGET}$ in the case of closed gripping elements with sheet-like material. As described above, it is beneficial in certain versions to feed the evaluating circuit an auxiliary signal such as a trigger signal, which is generated when the gripping elements are closed.

On the other hand, a method where the gripping elements are brought into a defined position, preferably a closed position, after the sheet-like material has been filed would be feasible as well. Here, the gripping device can be closed for example on the way back, thus reached a defined position. A new measurement process is triggered with the subsequent opening. The signal emitted by the sensor is preferably determined in an analog-to-digital converter through continuous scanning and preferably further processed in a computer such as a micro-controller. The no-voltage $U_{CLOSED}$ and/or target-value potential $U_{TARGET}$ for a grabbed sheet is preferably determined in a learning phase.

Further details, benefits and features of the invention result not only from the claims and the features—either alone and/or in combination—derived from them, but also from the preferred examples as noted in the following description of the drawings.

Figure 2:
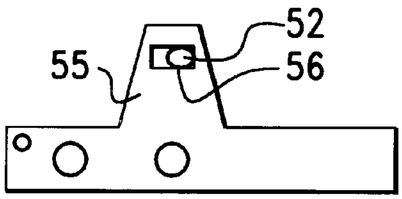

They show:

FIG. 1 side view of a gripping device with a first and second gripping element, FIG. 2 side view of the first gripping element in accordance with FIG. 1, FIG. 3 a first version of a signal processing device, FIG. 4 a second version of a signal processing device, FIG. 5 a third version of a signal processing device, and FIGS. 6*a*/6*b* time path of signals to be evaluated.

FIG. 1 depicts the side view of a gripping device 10, which is equipped with a gripping arm 12 that is fastened with a first end 14 via a clamping device to the axis 18 of for example a machine for the automatic insertion of bank statements or invoices (not shown). At a second end 20 of the gripping arm 12 the gripping device 10 is equipped with a first gripping element 22 and a second gripping element 24. The second gripping element 24 runs vertically to the gripping arm 12 and is firmly connected to it. The first gripping element 22 is part of a basically T-shaped lever 26 that is connected to the gripping arm 12 in a moveable fashion around an axis 28. In order to be able to actuate the first gripping element 22, the lever 26 is equipped with a leg 30, which is connected to a protrusion 36 that extends from the gripping arm 12 via a spring element 32 and an actuating lever 34 such as a compressed air cylinder.

The design provides for the spring element 32 to be a tension spring so that the first gripping element 22 rests on the second gripping element 24 with spring tension for the gripping of sheet-like material such as printed pages. For the purpose of opening the gripping elements 22, 24, the actuating element 34, such as a compressed air cylinder, is opened by admitting compressed air. The gripping elements 22, 24 have opposing gripping areas 38, 40, with the gripping area 40 being structured in order to enable safe gripping of the sheet-like material.

For the continuous recording of the relative position between the first gripping element 22 and the second gripping element 24, the gripping device 10 is equipped with a measuring device 42, which is connected to a signal processing device 46 via connecting lines 44. In the example shown here, the connecting lines 44 are connected to a connecting area 48 in close proximity to the axis 18 so that a feed line 50 to the signal processing device experiences as little stress as possible when the gripping arm 12 is moved.

In the example described here, the measuring device 42 comprises a transmitter 52 and a sensor 54 that is allocated to the transmitter 52 for the continuous recording of the first gripping element's 22 position.

As shown in FIG. 2, the transmitter 52, which has the design of a magnet, is incorporated in another leg 55 of the lever 26, which runs basically parallel or roughly parallel to the gripping arm 12. The sensor 54 allocated to it is arranged in the fixed gripping element 24 or the gripping arm 12 in the area of the transmitter 52 so that the movements of the lever 26 or the first gripping element 22 can be recorded. The design provides for the transmitter 52 to be incorporated into a recess 56 and fastened as well as glued.

Due to the sensor 54 in the gripping device 12, a signal, e.g. analog electric potential, is released, which is evaluated in the signal processing device 46. By actuating the first gripping element 22, a relative movement occurs between the sensor 54 and the transmitter 52, which can be recorded by the sensor. In particular, it can record whether any and how many sheets were grabbed by the gripping elements 22, 24 during the gripping process. In accordance with the number of sheets, e.g. whether no sheet, one sheet or several sheets were grabbed, the transmitter 52 takes on a different position in relation to the sensor 54 so that the sensor releases a slightly modified analog electric potential, which is evaluated in the signal processing device 46. Apart from the number of sheets that were grabbed, the signal emitted by the sensor also depends on the thickness of the sheet.

FIG. 3 depicts a first version of the signal processing device 46, which is connected to the measuring device 42 via a signal line 58. The signal processing device 46 consists basically of a compensating circuit 60, an amplifying circuit 62 and an evaluating circuit 64. The signal line 58 is connected to a first inlet 66 of the compensating circuit 60. A second inlet 68 of the compensating circuit is connected to a potentiometer 70 for no-voltage compensation.

One outlet 72 of the compensating circuit 60 is connected on the one hand with an inlet 74 of the amplifying circuit 62 and on the other hand with a first inlet 76 of the evaluating circuit 64. One outlet 78 of the amplifying circuit 62 is connected to a second inlet 80 of the evaluating circuit 64.

The evaluating circuit 64 is fed auxiliary signals, such as "Teach-In/1Sheet," "Teach-In/0 Sheets," as well as a trigger signal. Depending on the evaluation of the signal evaluated by the sensor 54, the evaluating circuit 64 emits a signal "Error/more than 1 sheet" or a signal "O.K./1 sheet."

The potential (no-voltage) released by the sensor 54 is compensated with a potential adjusted by the potentiometer 70 so that a change in potential or differential potential on the outlet 72 of the compensating circuit 60 is amplified by the subsequent amplifying circuit 62 and evaluated in the evaluating circuit 64. The evaluating circuit 64 releases the signal "O.K./1 sheet" if there is one sheet between the gripping elements 22, 24 or the signal "error/more than 1 sheet" if there is more than one sheet or no sheet in the gripper.

For initial or regular adjustments of the evaluating circuit (Teach-In), the evaluating circuit is fed the signals "Teach-In/1 Sheet" or "Teach-In/0 Sheets," with a zero value being determined in the case of closed gripping elements without sheet and a target value in the case of one sheet between the gripping elements 22, 24, with the value being dependent particularly on the sheet thickness of pages that are utilized. The inlets and outlets for the signals are only symbolic for information. The respective information can occur in a different form (FIG. 5) also as data transfer via an interface such as a CAN bus.

FIG. 4 depicts a second version of a signal processing device 46', which has basically the same design as the signal processing device 46. Contrary to the signal processing device 46, the evaluating circuit 64 has an outlet 82 for compensating auxiliary potential, which is connected to the second inlet 68 of the compensating circuit 60 via a line. In this version, the potentiometer 70 can be forgone, which for example has to be newly adjusted when changing the gripping device 12 or the transmitter 52. In order to adjust the amount of the auxiliary potential, the version provides for the outlet 72 of the compensating circuit 62 to be connected directly with the inlet 76 of the evaluating circuit 64 so that the evaluating circuit 64 also receives the non-amplified differential potential available at the outlet 72.

FIG. 5 shows another version of a signal processing device 84, with the measuring device 42 being equipped with the transmitter 52 and an intelligent Hall effect sensor 86. The intelligent Hall effect sensor 86 is connected to an inlet 90 of an evaluating circuit 92 via an outlet 88. The evaluating circuit 92 is connected to a higher machine control system 96 via a data bus such as a CAN bus.

The intelligent Hall effect sensor 86 is equipped with a Hall effect sensor element 98, which is connected to a compensating circuit 100 via a signal line. The compensating circuit 100 is connected on the outlet side with an amplifying circuit 102, which on the outlet side is connected to the outlet 88 and the evaluating circuit 92.

For the purpose of controlling the compensating circuit 100 or the amplifying circuit 102, a logic device 104 such as a micro-controller is provided for, which is connected to the compensating circuit 100 or the amplifying circuit 102 via internal bus lines 106, 108. Furthermore, the logic device 104 is connected to a data storage device 107 such as EEPROM. During the calibration process, the logic device 104 is furthermore connected to an external data processing system 112 via a bus 110. In the case of the intelligent Hall effect sensor 86, the internal logic device 104 can adjust both compensation of no-voltage and amplification. The data required for this is made available by the external data processing system 112. Deviating data can ten be stored in the data storage system 107.

A particularly beneficial version has proven to be a system where the evaluating circuit 92 is connected to a higher machine control system 96 via a bus such as a CAN bus. This offers the opportunity of being able to transmit for example data that conveys the quality of the paper (g/m$^2$) for adjusting the evaluating circuit and send messages "O.K./1 sheet" or "error/no or more than 1 sheet" in the opposite direction.

In the versions shown in FIG. 3 and 4, it is necessary to make a trigger signal available to the evaluating circuit in order to be able to provide information about the time of the measurement, i.e. gripper closed. A trigger signal can be forgone if the gripping elements 22, 24 taken on a defined position, e.g. a closed position, after filing a sheet. This way, the evaluating circuit 76, 92 can recognize the time of measurement autonomously.

Figure 6:
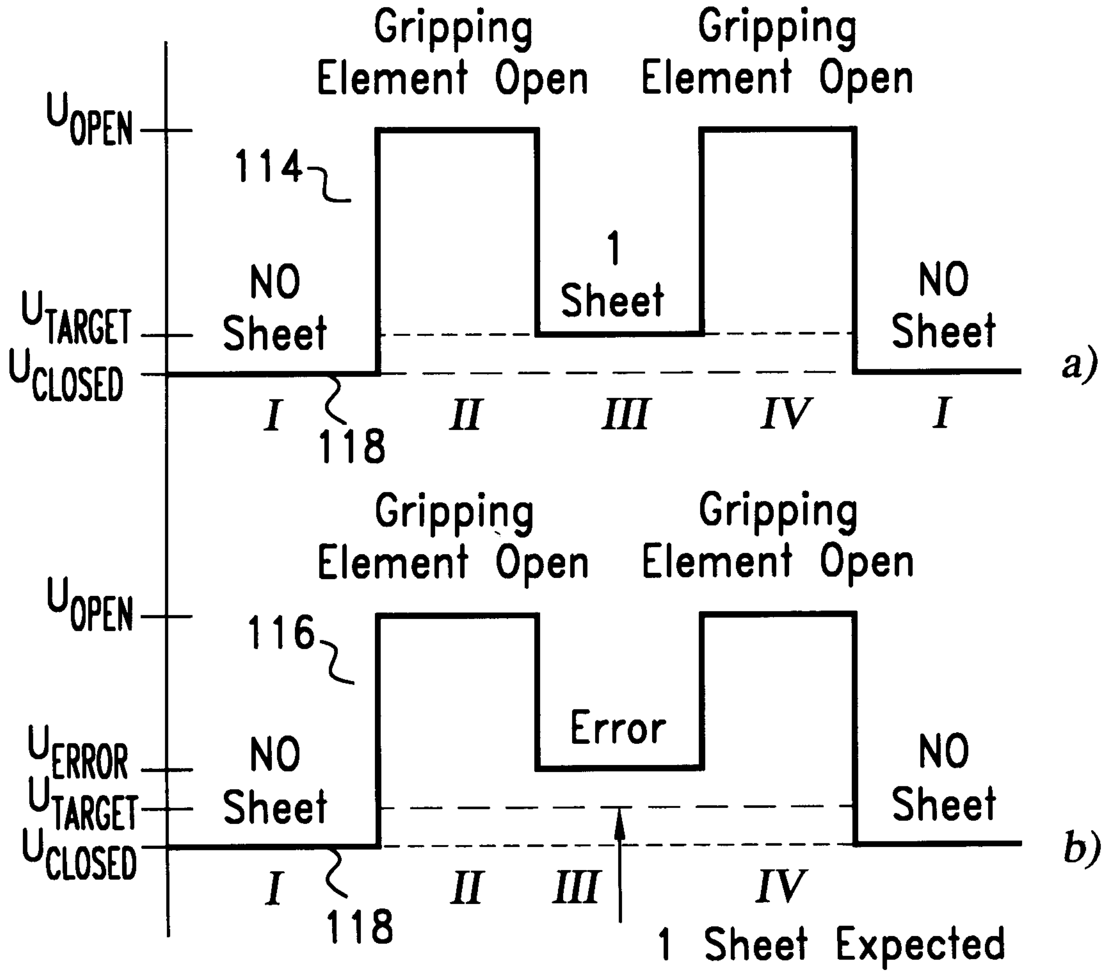

In FIG. 6 the course of the signals 114, 116 that are to be evaluated is shown. The course of signal 114 shown in FIG. 6*a* describes an operating phase, where the gripping device 10 grabs a sheet as desired. On the other hand, FIG. 6*b* shows the course of signal 116, which occurs during an operating phase if more than one sheet is grabbed.

The signal processing device 46, 46' or the evaluating circuit 92 is adjusted as follows:

In a first operating phase I, the gripping elements 22, 24 take on a defined position—preferably a closed position—which causes the signal 114, 116 to take on a zero value $U_{CLOSED}$. In a second operating phase II, the gripping elements 22, 24 are opened, which causes the signal 114, 116 again to take on a defined value $U_{OPEN}$. In a following operating phase III, a sheet is grabbed in accordance with the invention, with the gripping elements 22, 24 taking on a defined position towards each other in accordance with the sheet thickness, with a signal $U_{TARGET}$ being assigned to this position. The signal $U_{TARGET}$ is then stored.

In the following operating phase IV, the gripping elements 22, 24 are then separated from each so as to release the grabbed sheet so that the signal 114 takes on the value $U_{OPEN}$. The operating phase IV is followed by the operating phase I, where the gripping elements 22, 24 are closed and the signal 114 takes on the value $U_{CLOSED}$.

The signal values $U_{CLOSED}$, $U_{OPEN}$ and $U_{TARGET}$ are determined in a so-called learning phase and stored. FIG. 6*b* depicts the signal 116, which is assigned an error. Starting from the operating phase I, the gripping elements 22, 24 take on an open position in the subsequent operating phase II, with the signal 116 taking on the value $U_{OPEN}$. In the following operating phase III, the gripping elements grab more than one sheet so that the signal 116 takes on a value $U_{ERROR}$, which differs from the value $U_{TARGET}$. The difference in the determined signal values is recognized by the evaluating circuit and then an error message is generated. In the subsequent operating phase IV, the gripping elements 22, 24 are separated from each other so that the signal 116 takes on the value $U_{OPEN}$.

In the version shown here, the signal is evaluated as potential released by the measuring device. The potential 114, 116 changes its value, depending on whether the gripping elements are open or whether they grabbed a sheet in closed condition or are empty. In particular, the course of the potential is determined in a learning phase through continuous scanning with an analog-to-digital converter and processed and stored in a micro-computer. Due to the stored values $U_{CLOSED}$, $U_{TARGET}$ and $U_{OPEN}$ any further sequence of the signals can be checked for deviations. If in the operating phase III, in which the target value $U_{TARGET}$ is expected, a larger or smaller potential $U_{ERROR}$ occurs, the evaluating circuit reacts with an error message, which is used to stop the machine or sort the grabbed sheets.

What is claimed is:

1. Gripping device (10), particularly for automatic printing and/or inserting machines, with a first and second gripping element (22, 24), of which at least one gripping element (22) can be moved relative to the other gripping element (24) for grabbing sheet-like materials, as well as with a measuring device (42) for recording at least one position of the gripping elements (22, 24) towards each other, characterized by the fact that the measuring device (42) is equipped with a transmitter (52) and a sensor (54) that is allocated to it for the continuous recording of the relative position of the gripping elements (22, 24) towards one another, with the transmitter (52) being arranged in the moveable gripping element (22) and the sensor (54) in the fixed gripping element (24), or vice versa.

2. Gripping device in accordance with claim 1, characterized by the fact that the measuring device (42) releases a signal (114, 116), the height of which is proportional to a distance formed between the gripping elements (22, 24).

3. Gripping device in accordance with claim 1, characterized by the fact that the transmitter (52) is a magnet and the sensor (54) a Hall effect sensor.

4. Gripping device in accordance with claim 1, characterized by the fact that the sensor (54) is connected to a signal processing device (46, 46'), comprising a compensating circuit (60), an amplifying circuit (62) and an evaluating circuit (64).

5. Gripping device in accordance with claim 4, characterized by the fact that the sensor (54) is connected to a first inlet (66) of the compensating circuit (60), whose outlet (72) is connected on the one hand with an inlet (74) of the amplifying circuit (62) and on the other hand with a first inlet (76) of the evaluating circuit (64) and that an outlet (78) of the amplifying circuit (62) is connected to a second inlet (80) of the evaluating circuit (64).

6. Gripping device in accordance with claim 5, characterized by the fact that a second inlet (68) of the compensating circuit (60) is connected to a potentiometer (70).

7. Gripping device in accordance with claim 6, characterized by the fact that the second inlet (68) of the compensating circuit (60) is connected to an outlet (82) of the evaluating circuit (64).

8. Gripping device in accordance with claim 1, characterized by the fact that the sensor (54) is an intelligent sensor (86) with integrated compensating and amplifying circuit (100, 102), with the compensating and amplifying circuits being connected to an integrated logic device (104), which in turn is connected to a data storage system (106).

9. Gripping device in accordance with claim 8, characterized by the fact that the sensor (86) is connected to an external computer system (112) during the calibration process in order to transmit calibrating data.

10. Gripping device in accordance with claim 9, characterized by the fact that the sensor (86) is connected to an evaluating circuit (92), which is connected to a higher machine control system (96) via a CAN bus (94).

11. Gripping device in accordance with claim 10, characterized by the fact that the evaluating circuit (76) is connected to a trigger source that indicates the time of measurement.

12. Gripping device in accordance with claim 11, characterized by the fact that the evaluating circuit (76, 92) is equipped with a display device as well as keys and operating buttons in order to set the matching and specification of page thickness and similar information.

13. Gripping device in accordance with claim 1, characterized by the fact that page thickness or paper weight can be adjusted as target values.

14. Method for the recording of a relative position of gripping elements of a gripping device characterized by the fact that the position of the gripping elements towards each other is recorded continuously, that in accordance with a number of sheet-like goods grabbed between the gripping elements a signal is generated with different signal values and/or that the signal values are compared to target values and that in the case of a deviation an error message is created.

15. Method in accordance with claim 14, characterized by the fact that the signal that is generated is compensated, amplified and then evaluated.

16. Method in accordance with claim 14, characterized by the fact that auxiliary signals fed for the evaluation of the signal so that the time of the measurement, when the gripping elements are closed, can be provided.

17. Method in accordance with claim 16, characterized by the fact that for the adjustment of the evaluating circuit (Teach-In) a zero value is determined for closed gripping elements without sheet-like material and a target value for closed gripping elements with sheet-like material.

18. Method in accordance with claim 17, characterized by the fact that upon filing of the sheet-like material the gripping elements take on a defined position and that the zero value (UCL05ED) and/or the target value (UTAROET) are determined for a grabbed sheet during a learning phase.

19. Method in accordance with claim 14, characterized by the fact that the signal is determined through continuous scanning with an analog-to-digital converter and further processed in a micro-computer.

* * * * *